United States Patent
Burkhart et al.

(10) Patent No.: US 11,909,219 B2
(45) Date of Patent: Feb. 20, 2024

(54) PORTABLE DEVICE CONFIGURED FOR CHARGING ELECTRONIC DEVICES

(71) Applicant: Société Bic, Clichy (FR)

(72) Inventors: Steven A. Burkhart, Woodbridge, CT (US); Loïc Folgoas, Loctudy (FR)

(73) Assignee: Société Bic, Clichy (FR)

( * ) Notice: Subject to any disclaimer, the term of this patent is extended or adjusted under 35 U.S.C. 154(b) by 385 days.

(21) Appl. No.: 17/114,683

(22) Filed: Dec. 8, 2020

(65) Prior Publication Data

US 2021/0194281 A1 Jun. 24, 2021

Related U.S. Application Data

(60) Provisional application No. 62/950,533, filed on Dec. 19, 2019.

(51) Int. Cl.
  *H02J 50/00* (2016.01)
  *H02J 50/80* (2016.01)
  *H02J 50/10* (2016.01)

(52) U.S. Cl.
  CPC ............ *H02J 50/005* (2020.01); *H02J 50/10* (2016.02); *H02J 50/80* (2016.02)

(58) Field of Classification Search
  CPC ........... H02J 50/005; H02J 50/10; H02J 50/80
  See application file for complete search history.

(56) References Cited

U.S. PATENT DOCUMENTS

| | | | |
|---|---|---|---|
| 7,782,610 B2 | 8/2010 | Diebel et al. | |
| 8,410,637 B2 | 4/2013 | Karaoguz et al. | |
| 9,240,702 B2 | 1/2016 | Soar | |
| 10,635,203 B2 * | 4/2020 | Rolion | B43K 5/005 |
| 2010/0021022 A1 * | 1/2010 | Pittel | G06F 3/03545 206/320 |
| 2012/0249449 A1 * | 10/2012 | Tseng | H02J 50/20 345/173 |
| 2012/0274148 A1 | 11/2012 | Sung et al. | |
| 2012/0315074 A1 * | 12/2012 | Roberts | B43K 24/14 401/32 |
| 2014/0266026 A1 * | 9/2014 | Dowd | H02J 7/0044 320/108 |
| 2015/0002088 A1 | 1/2015 | D'Agostino | |
| 2016/0013656 A1 | 1/2016 | Bell et al. | |
| 2016/0322850 A1 | 1/2016 | Yeh et al. | |
| 2016/0056648 A1 * | 2/2016 | Dowd | H02J 7/0047 320/107 |

(Continued)

OTHER PUBLICATIONS

Chris Davies, "Beyond Ink Pen Review: Stylus, storage, and battery in one", available at https://www.slashgear.com/beyond-ink-pen-review-stylus-storage-and-battery-in-one-23449342/, Jul. 23, 2016, (10 pages).

*Primary Examiner* — Stacy Whitmore
(74) *Attorney, Agent, or Firm* — Bookoff McAndrews, PLLC

(57) ABSTRACT

A device for wirelessly charging electronics, the device comprising a housing, at least one writing instrument disposed in the housing, a power transmitter disposed inside or formed on the housing, the power transmitter being configured to transmit power for charging electronics, and a battery disposed inside or embedded in the housing, the battery being configured to provide power to the power transmitter to transmit the power.

20 Claims, 6 Drawing Sheets

(56) References Cited

U.S. PATENT DOCUMENTS

| | | | |
|---|---|---|---|
| 2016/0089927 A1* | 3/2016 | Hsu | B43K 29/08 |
| | | | 401/195 |
| 2016/0191121 A1 | 6/2016 | Bell et al. | |
| 2017/0025887 A1 | 1/2017 | Hyun et al. | |
| 2017/0270904 A1* | 9/2017 | Suitor | G10H 1/0083 |
| 2018/0076489 A1* | 3/2018 | Mikami | H01M 4/366 |
| 2018/0166894 A1* | 6/2018 | Miller | B41J 3/445 |
| 2018/0212473 A1 | 7/2018 | Kim et al. | |
| 2019/0379959 A1* | 12/2019 | Kim | H04R 1/04 |
| 2020/0036229 A1* | 1/2020 | Pinciuc | H02J 50/90 |
| 2020/0089340 A1* | 3/2020 | Ruscher | G06F 3/03545 |
| 2021/0155030 A1* | 5/2021 | Kurani | G06F 3/016 |
| 2021/0194281 A1* | 6/2021 | Burkhart | H02J 50/10 |
| 2021/0303089 A1* | 9/2021 | Ruscher | H02J 50/10 |
| 2021/0349553 A1* | 11/2021 | Lee | H02J 7/342 |

\* cited by examiner

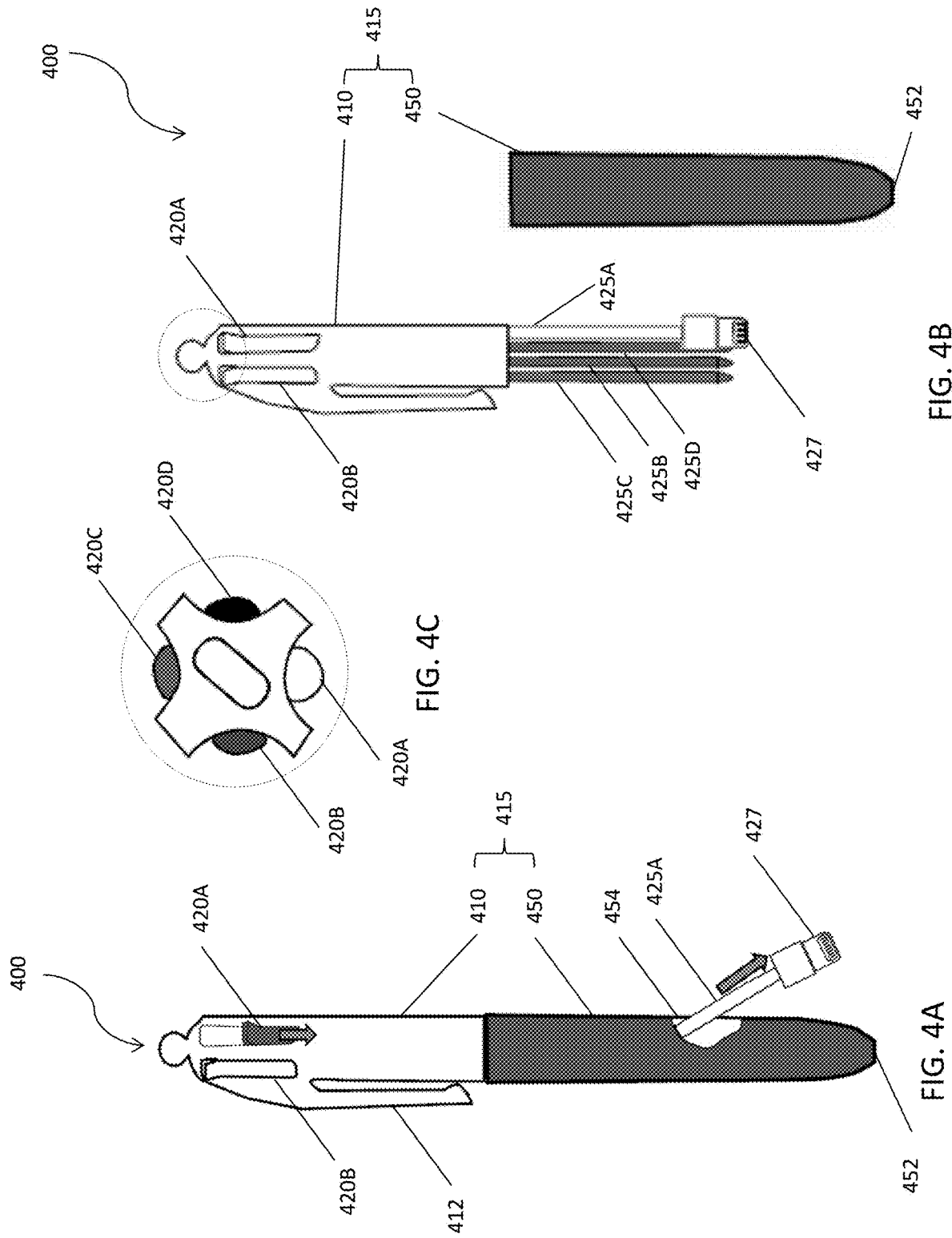

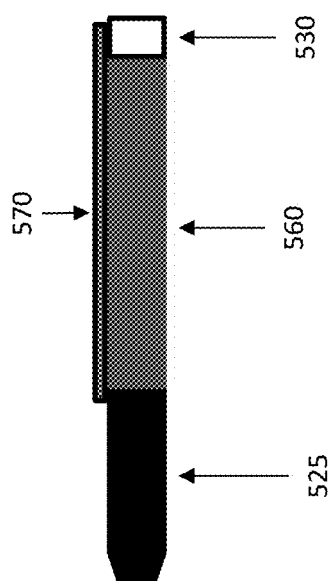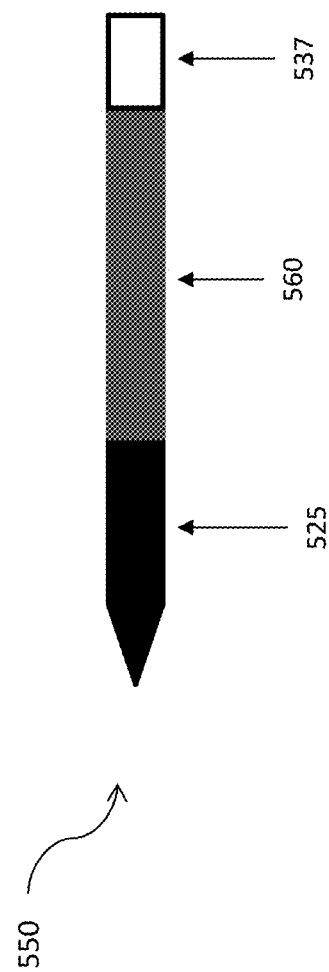
FIG. 5A
FIG. 5B

PORTABLE DEVICE CONFIGURED FOR CHARGING ELECTRONIC DEVICES

CROSS REFERENCE TO RELATED APPLICATION

This application is a nonprovisional application claiming benefit to U.S. Provisional Application No. 62/950,533, filed on Dec. 19, 2019, which is incorporated herein by reference in its entirety.

FIELD

The present disclosure relates to a charging device. More particularly, the present disclosure relates to a portable device configured for wireless or wired charging.

BACKGROUND

Portable electronic devices and the amount of time and resources spent using portable electronic devices has increased rapidly in recent years. Users on-the-go desire access to electricity in order to charge these portable electronic devices. Currently, a quick charging method known as "snacking" provides users with a means to recharge their devices, so that the devices may retain enough charge to be operable until a next "snacking" opportunity.

The background description provided herein is for the purpose of generally presenting the context of the disclosure. Unless otherwise indicated herein, the materials described in this section are not prior art to the claims in this application and are not admitted to being prior art, or suggestions of the prior art, by inclusion in this section.

BRIEF DESCRIPTION OF THE DRAWINGS

Embodiments of the present disclosure will now be described, by way of example only, with reference to the accompanying drawings in which:

FIG. 4A is a side view of an embodiment of a portable wired charging device, according to one aspect of the present disclosure.

FIG. 4B is a partially exploded view of the portable charging device depicted in FIG. 4A.

FIG. 4C is a top or end view of the portable charging device depicted in FIGS. 4A and 4B.

FIG. 5A is a schematic side view of another embodiment of a portable wireless charging device, according to one aspect of the present disclosure.

FIG. 5B is a schematic side view of another embodiment of a portable wired charging device, according to one aspect of the present disclosure.

SUMMARY

It should be noted that the description set forth herein is merely illustrative in nature and is not intended to limit the embodiments of the subject matter, or the application and uses of such embodiments. Any implementation described herein as exemplary is not to be construed as preferred or advantageous over other implementations. Rather, the term "exemplary" is used in the sense of example or "illustrative," rather than "ideal." The terms "comprise," "include," "have," "with," and any variations thereof are used synonymously to denote or describe a non-exclusive inclusion. As such, a device or a method that uses such terms does not include only those elements or steps but may include other elements and steps not expressly listed or inherent to such device and method. Further, the terms "first," "second," and the like, herein do not denote any order, quantity, or importance, but rather are used to distinguish one element from another. Similarly, terms of relative orientation, such as "top," "bottom," etc. are used with reference to the orientation of the structure illustrated in the figures being described. Moreover, the terms "a" and "an" herein do not denote a limitation of quantity, but rather denote the presence of at least one of the referenced items. It should also be noted that all numeric values disclosed herein may have a variation of ±10% (unless a different variation is specified) from the disclosed numeric value. Further, all relative terms such as "about," "substantially," "approximately," etc. are used to indicate a possible variation of ±10% (unless noted otherwise or another variation is specified).

Currently, a quick charging method known as "snacking" provides users with a means to recharge their devices, so that the devices may retain enough charge to be operable until a next "snacking" opportunity.

Aspects of the disclosure includes:

A device for wirelessly charging electronics, the device comprising:
 a housing;
 at least one writing instrument disposed in the housing;
 a power transmitter disposed inside or formed on the housing, the power transmitter being configured to transmit power for charging electronics; and
 a battery disposed inside or embedded in the housing, the battery being configured to provide power to the power transmitter to transmit the power.

A device for charging electronics, the device comprising:
 a housing including an opening;
 a writing instrument;
 a first actuation mechanism formed on the housing and being operatively connected to the writing instrument;
 a charging cable;
 a second actuation mechanism formed on the housing and being operatively connected to the charging cable, wherein the charging cable is configured to slide out of the opening when the second actuation mechanism is pushed; and
 a battery configured to provide power through the charging cable.

DETAILED DESCRIPTION

Figure 1:
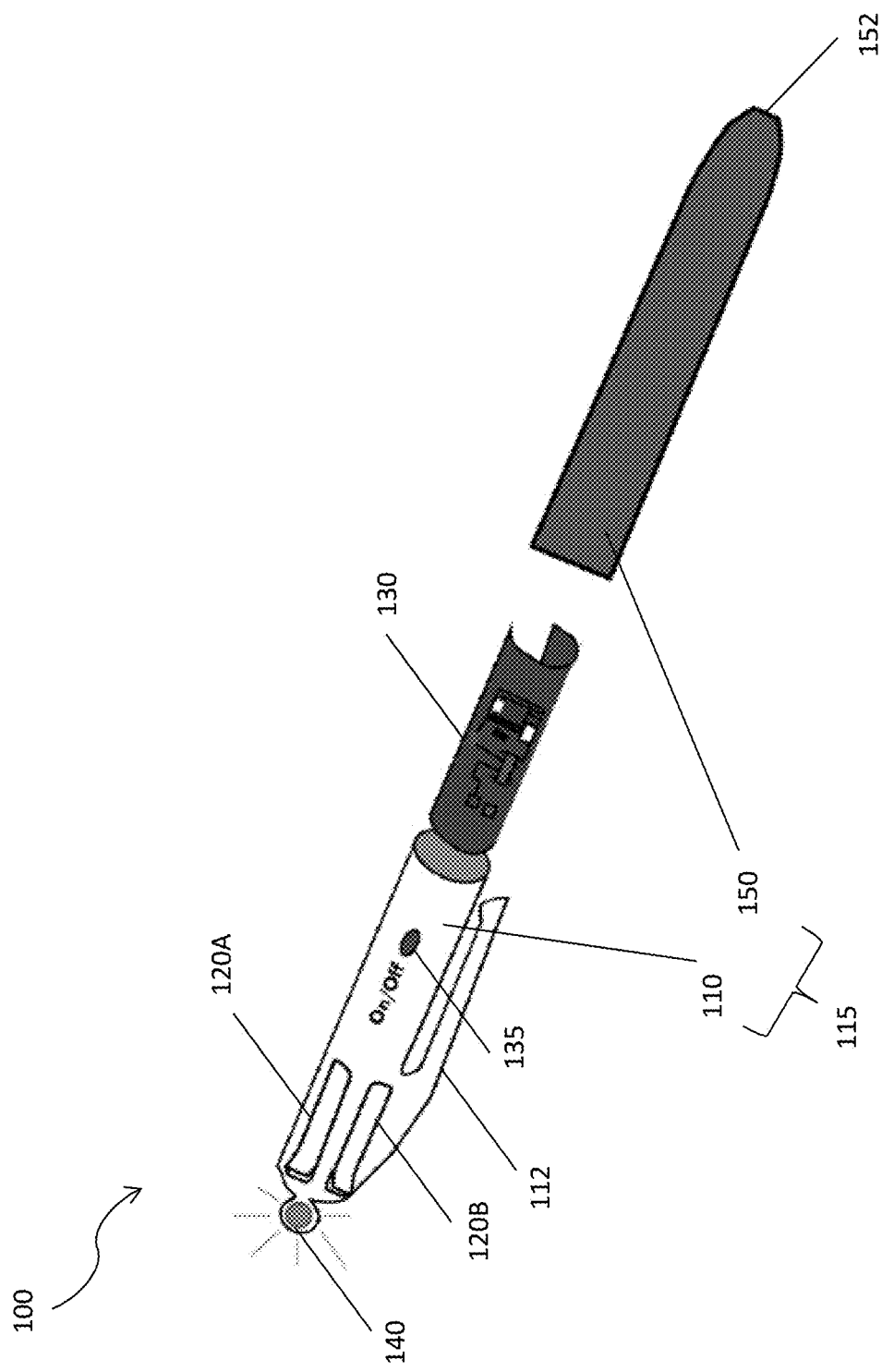
FIG. 1 is an exploded perspective view of an embodiment of a portable wireless charging device, according to one aspect of the present disclosure.

The disclosure involves a device 100, as shown in FIG. 1, configured for wireless charging. The device 100 may be, for example, a writing instrument such as, for example, a pen, mechanical pencil, stylus, marker, and combination thereof, as depicted in FIG. 1. While a writing instrument is detailed herein, the device 100 may be any portable device such as, for example, a correction tape, a shaver, a lighter, etc. In other words, the exemplary embodiments herein may not be limited to implementation in writing instruments, but may also be implemented with other portable devices, machines, systems, components, or in any other similar context in which the contemplated embodiments may be applicable.

In general, the device 100 may include a first housing 110 and a second housing 150, which may together form an elongated body 115 of the device 100. In one embodiment, the first housing 110 and the second housing 150 may initially be separate components, and may be joined together to form a uniform, continuous elongated body 115 by snap-fit, twist-screw connection, or any other similar connection that is now known or later developed in the art. In some embodiments, the elongated body 115 may be a unitary or single component. The elongated body 115 may also include a clip 112, enabling the user to attach the device 100 to an object. The clip 112 may be formed as a part of the first housing 110 as shown in FIG. 1 but may also be formed at any suitable location on the outer sidewall of the elongated body 115. In general, the shape of the elongated body 115 may be cylindrical. However, the elongated body 115 may be of any suitable shape capable of accommodating the various embodiments disclosed herein.

The device 100 may be configured to wirelessly charge other devices, such as, for example, portable electronic devices, in close proximity. Such wireless charging device 100 may not include any mechanical link subject to breakage, such as connectors, cables, or other parts necessary for a physical connection. For example, the use of charging cables and electrical connectors, which might break or wear out easily, would not be required in wireless charging embodiments. The wireless charging device 100 may also avoid exerting stress and/or causing burnouts on the charging port of a receiving electronic device, as power transfer would occur without any physical connection. As alluded to above, wireless charging also removes the need to use electrical connectors, which can create electrical spikes or shocks that might damage the device or hurt the user. Therefore, the wireless charging device 100 may provide an overall safer way to transfer power to electronic devices. Furthermore, the wireless charging device 100 may eliminate the need to have different cables and electrical connectors for different types of electronic devices, providing a more convenient charging experience to users.

In one embodiment, the device 100 may be configured to wirelessly charge other portable electronic devices within a radius of approximately 2-3 feet. However, the radius may extend farther than 2-3 feet such as, for example, up to approximately 30 feet, or more. The wireless charging feature may utilize a power transmitter that emits a low wattage (W) charge. The power transmitter may be installed inside the elongated body 115 of the device 100. To that end, the elongated body 115 (e.g., the first housing 110 and the second housing 150) may have a horizontal diameter and/or a vertical height that are large enough to host the power transmitter or components thereof. The components of the power transmitter may comprise a printed circuit board (PCB) 130, an induction coil, and a battery, which will be described below in greater detail.

To activate or deactivate wireless charging, a switch 135 may be added on the outer surface of the elongated body 115. The switch 135 may be an on/off switch that is labeled accordingly, and may be used to activate or deactivate the wireless charging feature of the device 100. In one embodiment, the switch 135 may be positioned on the outer sidewall of the first housing 110 such that the likelihood of inadvertently pressing the switch 135 may be minimized. For example, the switch 135 may be positioned a certain distance below the top of the first housing 110, and a certain distance above the second housing 150, such that the switch 135 might not be inadvertently pressed when the user is utilizing the device 100, such as, for example, during a writing activity. More specifically, the switch 135 may be positioned a certain distance below a series of actuation mechanisms 120A, 120B located near the top of the first housing 110, and a certain distance above the top of the second housing 150. However, the switch 135 may be positioned at any suitable location on the outer sidewall of the elongated body 115, depending on the use and corresponding characteristics of the device 100.

In one embodiment, the device 100 may be configured to produce multiple colors. Hence, the actuation mechanisms 120A, 120B may be, for example, buttons disposed on the outer sidewall of the elongated body 115. The actuation mechanisms may allow the user to select and use from multiple colors during a writing activity. While only the actuation mechanisms 120A and 120B are visible in FIG. 1, there might be additional actuation mechanisms on the other side of the device 100. In other words, the number of actuation mechanisms may be customizable. Each actuation mechanism 120A and 120B may be colored and configured to connect to a writing instrument, such as, for example, an ink cartridge or lead pencil that is disposed inside the elongated body 115 and that has a color which corresponds to the color of the actuation mechanism 120A and 120B (The ink cartridge and lead pencil are not shown in FIG. 1 but are detailed more herein below). An end of the writing instrument may be a felt tip, ball point tip, lead tip or any other tip well known for writing, drawing, etc. A user pushing down on an actuation mechanism may facilitate partially ejecting, extending, or deploying the end of the corresponding writing instrument to slide out of the second housing 150 such that the end of the writing instrument protrudes through an opening 152 formed at a distal end of the second housing 150. Although the actuation mechanisms 120A and 120B are shown to be located near the top of the elongated body 115, the actuation mechanisms 120A and 120B may be positioned at any other suitable locations on the outer sidewall of the elongated body 115. In some embodiments, the device 100 may be configured to produce a single color. In such a case, the device 100 may comprise a single colored actuation mechanism disposed on the outer surface of the elongated body 115 and a corresponding writing instrument disposed inside the elongated body 115. However, in some embodiments, the device 100 that is configured to produce a single color may also include multiple actuation mechanisms, all of one color or all of the same color, and that correspond with writing instruments, all of just one color or all of the same color. In yet another embodiment, the device 100 may be configured to produce a single color and may not comprise any actuation mechanism. Hence, the writing instrument in such a device 100 may be fixed, and the end of the writing instrument may be exposed permanently outside the opening 152 and is not capable of being extended or retracted into and out of the elongated body 115. In yet another embodiment, device 100 may include exactly one actuation mechanism at a top-most portion of the first housing 110 for deploying the end of the writing instrument through the opening 152 and outside of the elongated body 115. The actuation mechanisms, either multiple or single, may be used to facilitate movement of the end of the writing instrument between a deployed position outside of the elongated body 115 and a retracted position inside of the elongated body 115.

The device 100 may include an indicator 140 positioned at any suitable location on the outer surface of the elongated body 115. In one embodiment, the indicator 140 may be positioned at an end of the elongated body 115 opposite to the opening 152. In other embodiments, the indicator 140 may be positioned at any suitable location on the outer sidewall of the elongated body 115. The indicator 140 may signal to the user that the device 100 is in a wireless charging mode. The indicator 140 may also be configured to signal whether an internal battery acting as a power source for wireless charging is low and needs to be replaced or recharged. In order to signal various conditions associated with the wireless charging feature, the indicator 140 may be a light source such as, for example, a light-emitting diode (LED) light, or any other suitable light source that is now known or later developed. The light emitted by the indicator 140 may be color-coded, may be turned on continuously, and/or may flash at a predefined rate, in order to distinctively signal various conditions. For example, a first color may indicate that the device 100 is wirelessly charging another device; a second color, different from the first color, may indicate that the device 100 is being charged itself (by wired or wireless mechanisms); and a third color, different from the first and second colors, may indicate that the internal battery of the device 100 is low.

The device 100 may also include a PCB 130 disposed inside the elongated body 115. The PCB 130 may include the circuitry required to enable the wireless charging feature (e.g., a wireless charging circuit), and to activate or deactivate the wireless charging feature based on the input received via the switch 135. To that end, the PCB 130 in the device 100 may include a wireless charging circuit. However, the PCB 130 may include other circuitries configured to perform the functions of the device 100 described herein. Further, the PCB 130 may control the light emitted by the indicator 140 to signal various conditions associated with the wireless charging feature. In one embodiment, the PCB 130 may be a flexible PCB, and may be bendable to fit within the elongated body 115. The PCB 130 may include certain components that are not bendable (i.e., solid components), but those components may be small enough to allow the overall PCB 130 to flex or bend to fit within the elongated body 115. For example, as shown in FIG. 1, the PCB 130 may be bent or rolled along an inner wall of the elongated body 115, in order to not obstruct or interfere with other components of the device 100 associated with writing or drawing (e.g., ink cartridge(s), lead, etc.). The PCB 130 may thus be positioned between the inner wall of the elongated body 115 and the writing instrument(s). When rolled along the inner wall of the elongated body 115, the PCB 130 may extend over a circumferential distance spanning approximately between 25% to 33% of an inner circumference of the elongated body 115. However, it is contemplated in other embodiments, that the PCB 130 might span other suitable distances of the inner circumference of the elongated body 115, such as, for example, more or less than 25%, more or less than 33%, more or less than 50%, or more or less than 75% of the inner circumference of the elongated body 115. In the case of a device 100 comprising four writing instruments, the PCB 130 may extend over a circumferential distance spanning approximately one or two of the writing instruments. However, as noted above, the PCB 130 may cover more or less of the inner circumferential distance of the elongated body 115.

Although not shown explicitly in FIG. 1, an induction coil and a battery may also be disposed inside the elongated body 115 and may be connected to the PCB 130. The induction coil (e.g., coil antenna) may enable wireless inductive charging such as, for example, Qi charging, for wireless inductive charging-enabled devices. Wireless inductive charging uses a resonant inductive coupling between a sender device and a receiver device, to transfer energy from the sender device to the receiver device. The sender device may use an induction coil to create an electromagnetic field. The electromagnetic field created by the induction coil may induce a current flow in another induction coil in the receiver device, facilitating electronic power transfer between the sender device and the receiver device. In other words, an induction coil disposed in the device 100 may create an electromagnetic field, and an induction coil in the receiver device may take power from the electromagnetic field and convert it into electric current. The electronic current may then be used to charge a battery included in the receiver device.

In contrast to a wireless charging methodology which requires the receiver device be in a specific location and/or direction (i.e., orientation) relative to the sender device, the device 100 may allow for omnidirectional wireless charging by placing one or more induction coils in one or more locations inside the elongated body 115. The placement of the induction coils may be optimized such that the receiver device may receive power from the device 100 in any direction and in a three-dimensional space all around the device 100. The induction coils used for such omnidirectional wireless charging capability may comprise, for example, crossed dipole coils. The receiver device may also comprise induction coils that are similarly configured as those of the device 100, in order to facilitate the omnidirectional wireless charging. In some embodiments however, the induction coil may be placed in a single (i.e., only one) location within the elongated body 115, and may require the receiver device to be positioned in a certain location and/or direction relative to the device 100. The induction coil(s) may be placed inside the elongated body 115 such that the coil(s) may not interfere with or obstruct the components associated with the disclosed writing/drawing functions.

As alluded to above, a battery may also be disposed inside the elongated body 115 and connected to the PCB 130. In some embodiments, the battery can belong to an external device, such as for example, an external portable charging device disclosed in U.S. Pat. No. 10,374,449, the content of which may be incorporated herein by reference. The PCB 130 may receive AC power from the battery and provide a source current to the induction coil(s) for creating the electromagnetic field. In one embodiment, the battery may be a disposable battery such as, for example, a lithium or Ni—Cd battery. In other embodiments, the battery may be a rechargeable battery such as, for example, a lithium-ion battery, and the device 100 may have means to charge the battery in a wired or wireless manner. For instance, the device 100 may include a port that can be used for charging the rechargeable battery, such as a universal serial bus (USB) port, a micro USB port, a lightning port, an AC adapter port, or any other port that is now known or later developed for charging a device or a battery therein. An appropriately-sized battery may be selected to fit inside the elongated body 115 without significantly impacting the portability and/or usability of the device 100. The battery may be a standard cylindrical battery with a charging capacity of approximately 300 mAh (milliampere hour), 500 mAh, or any other suitable value, and may be approximately 8 mm (millimeter) in diameter and 57 mm in height, although other suitable dimensions are also contemplated. In some embodiments, the battery may be embedded in the PCB 130. In some embodiments where the PCB 130 is flexible, the battery may be spaced apart from the PCB 130 and may be coupled to the PCB 130 by, for example, a lead or other suitable structure that electrically couples the battery and the PCB 130.

Figure 3B:
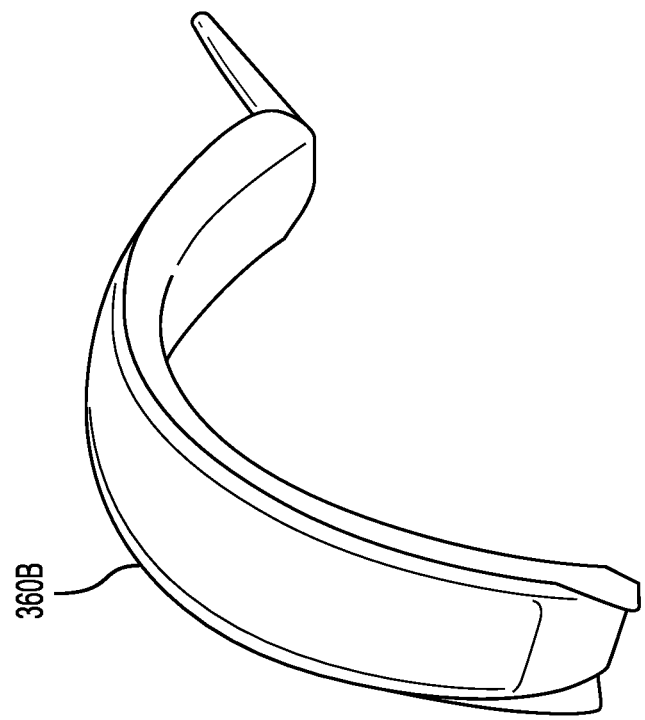
FIG. 3B is a perspective view of another battery usable in the portable charging devices in the present disclosure.
Figure 3A:
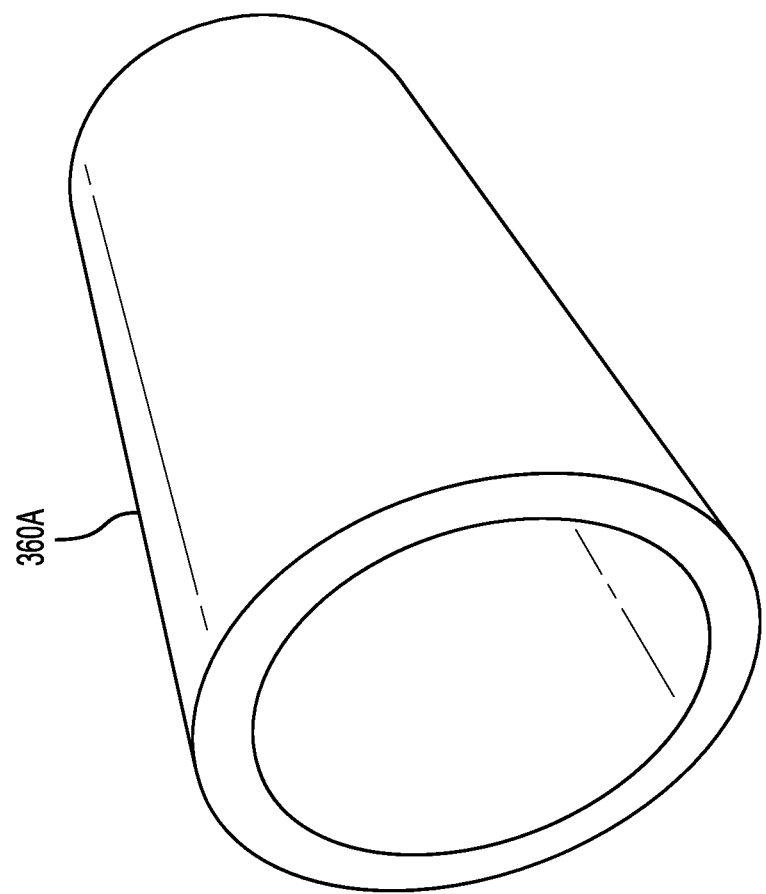
FIG. 3A is a perspective view of a battery usable in the portable charging devices in the present disclosure.

In another embodiment, as shown in FIG. 3A, a battery 360A that is cylindrical-shaped with a hollow center may be embedded in or may form a part of the first housing 110 or the second housing 150. In yet another embodiment, as shown in FIG. 3B, a battery 360B that is arc-shaped may be embedded in or may form a part of the first housing 110 or the second housing 150. The battery 360B may thus extend only partially around a circumference of the first housing 110 or the second housing 150. Instead of being embedded in or being formed a part of the housing 110 or 150, the battery 360A or 360B may be formed on the inner wall or outer sidewall of the elongated body 115. In one embodiment, the battery 360A or 360B may have a charging capacity that is less than or equal to approximately 200 mAh. The charging capacity of a battery is usually proportional to the size and/or weight of the battery. For instance, batteries with a higher charging capacity are usually bigger and/or heavier. Thus, the dimensions of the battery (e.g., diameter, thickness, circumference, length, etc.) may be adjusted in order to increase or decrease the charging capacity, based on the charging needs, dimensions and characteristics of other components of the device 100, and/or such that the writing/drawing experience is not substantially degraded by negatively impacting the weight, center of gravity, and other relevant characteristics of the device 100.

It should be noted that, although an induction coil is presented as an exemplary component configured to transfer power wirelessly from one device to another (i.e., a power transmitter), other types of components may also be used to transfer power wirelessly. For example, electronic components in plastic materials such as, for example, plastronics components, may be used to integrate one or more antennas with the device 100. In such a case, the one or more antennas may be installed inside the elongated body 115, or may be formed on the outer sidewall of the elongated body 115. As another example, one or more ceramic antennas may be integrated with the device 100 to transfer power wirelessly. Similarly, the one or more ceramic antennas may be installed inside the elongated body 115, or may be formed on the outer sidewall of the elongated body 115. Therefore, it will be apparent to one of ordinary skill in the art that a component configured to transfer power wirelessly from the device 100 to a receiver device may not be limited to the exemplary components discussed explicitly herein, but may be any suitable device that is now known or later developed for transferring power wirelessly.

Figure 2A:
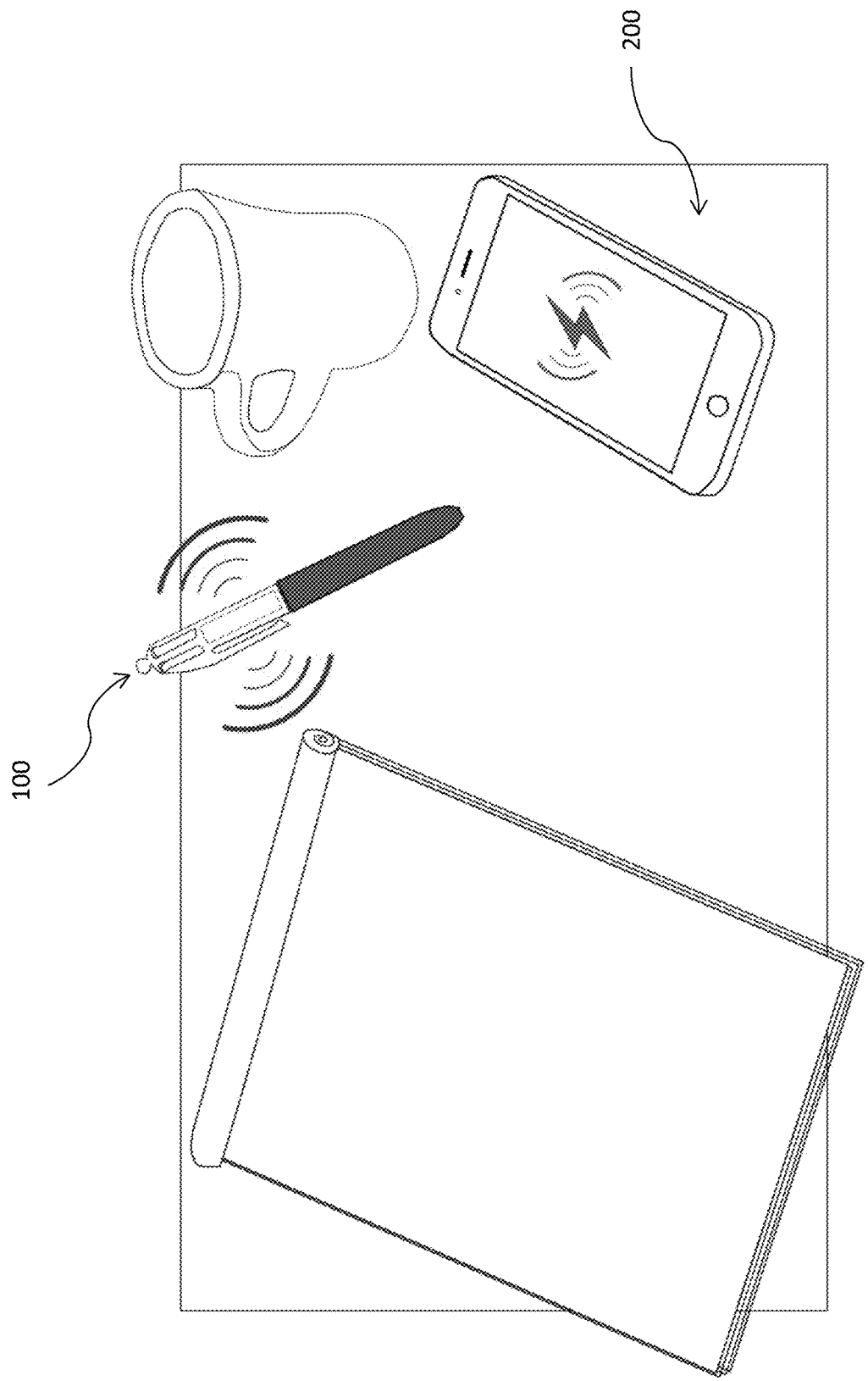
FIG. 2A is an exemplary context in which the portable charging device of FIG. 1 may be used.

FIG. 2A shows an exemplary context in which the device contemplated in the present disclosure may be used. In FIG. 2A, a user may utilize the device 100 for writing/drawing. However, the device 100 or sender device 100 may be positioned within the designated accessible wireless range of 2-30 feet of a receiver device 200 such as a mobile phone that may be low on power, and may provide power wirelessly to charge the receiver device 200. The user may activate the wireless charging feature of the device 100 by pressing the switch 135 and may either resume writing/drawing or rest the device 100 on a desktop or any other surface. As long as the device 100 and the receiver device 200 are within the wireless charging range, the receiver device 200 may start charging by using the power received from the device 100. While a mobile phone is discussed, it is feasible that the device 100 may also be used with other portable electronic devices such as, for example, a laptop computer, electronic reading tablets, earphones, speakers, microphones, and other audio devices.

Figure 2B:
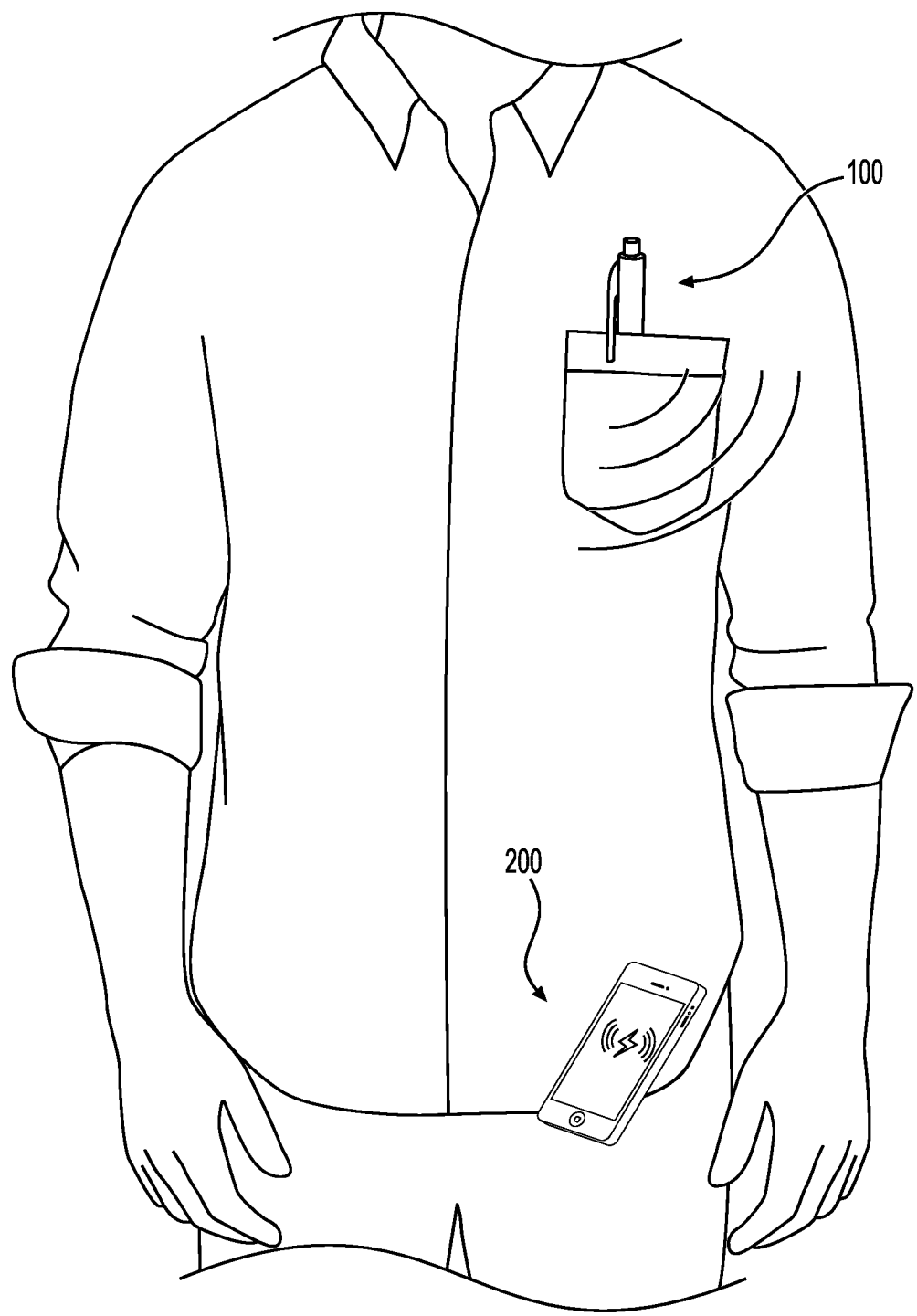
FIG. 2B is another exemplary context in which the portable charging device of FIG. 1 may be used.

FIG. 2B shows another exemplary context in which the device 100 of the present disclosure may be used. In FIG. 2B, a user may be in possession of the device 100 but may not be actually using the device 100 for writing/drawing. For instance, the user may have the device 100 close to his/her body such as, for example, in his/her shirt pocket, and may have the receiver device 200 in his/her pants pocket or hand, or vice versa. If the device 100 and the receiver device 200 are within the wireless charging range, the receiver device 200 may start charging by using the power received from the device 100 once the wireless charging feature of the device 100 is turned on via the switch 135. It will be apparent that the uses of the device 100 as illustrated in FIGS. 2A-2B are merely exemplary, and that the device 100 and its wireless charging capability may be used in a variety of contexts.

FIG. 4A shows a side view of an embodiment of a device 400 configured for wired charging. The device 400 may be a portable device. The device 400 may also be used for writing or drawing. FIG. 4B shows a partially exploded view of the portable device depicted in FIG. 4A. FIG. 4C is a top or end view of the portable device depicted in FIGS. 4A and 4B. In the description below, reference will be made to FIGS. 4A-4C.

In lieu of the wireless charging capability illustrated in reference to FIG. 1, the device 400 may also be capable of charging other electronic devices, but in a "wired" manner. Such wired charging device 400 may have a relatively high charging efficiency and may be compatible with a relatively high number of electronic devices. In general, and similarly to the device 100, the device 400 may include a first housing 410 and a second housing 450, which may together form an elongated body 415 of the device 400. In one embodiment, the first housing 410 and the second housing 450 may initially be separate components, and may be joined together to form a uniform, continuous elongated body 415 by snap-fit, twist-screw connection, or any other similar connection that is now known or later developed in the art. In some embodiments, the elongated body 415 may be a unitary or single component. The elongated body 415 may also include a clip 412, enabling the user to attach the device 400 to an object. The clip 412 may be formed as a part of the first housing 410, as shown in FIG. 4A, but may also be formed at any suitable location on the outer sidewall of the elongated body 415. In general, the shape of the elongated body 415 may be cylindrical. However, the elongated body 415 may be of any suitable shape capable of accommodating the various embodiments disclosed herein.

In one embodiment, the device 400 may be configured to accommodate a wired charging function, as well as may be configured to produce multiple colors. Hence, the device 400 may include multiple actuation mechanisms 420A, 420B, 420C, 420D. Actuation mechanism 420A may be configured solely to the wired function of the device 400, while actuation mechanisms 420B, 420C, 420D may be configured to facilitate the use of multiple colors during a writing or drawing activity. The actuation mechanisms 420A, 420B, 420C, 420D may be such as, for example, buttons disposed on the outer sidewall of the elongated body 415.

As noted above with the previous embodiment of FIG. 1, the actuation mechanisms 420B, 420C, 420D allow the user to select from and use multiple colors during the writing activity. Each actuation mechanism 420B, 420C, 420D may be connected to a corresponding writing instrument 425B, 425C, 425D such as, for example, an ink cartridge or lead pencil that is disposed inside the elongated body 415. The actuation mechanisms 420B, 420C, 420D may be a color that corresponds with a color of ink contained in the writing instruments 425B, 425C, 425D. An end of the writing instruments 425B, 425C, 425D may be a felt tip, ball point tip, lead tip or any other tip well known for writing, drawing, etc. A user pushing down on the actuation mechanisms 420B, 420C, 420D may facilitate partially ejecting, extending or deploying the end of the corresponding writing instruments 425B, 425C, 425D to slide out of the second housing 450. The ejection, extension or deployment of the end of the writing instruments 425B, 425C, 425D may cause the end of the writing instruments 425B, 425C, 425D to protrude through an opening 452 formed at a distal end of the second housing 450. Although the actuation mechanisms 420B, 420C, and 420D are shown to be located near the top of the elongated body 415, the actuation mechanisms 420B, 420C, and 420D may also be positioned at any other suitable locations on the outer sidewall of the elongated body 415. In some embodiments, the device 400 may be configured to produce a single color. In such a case, the device 400 may include only one actuation mechanism disposed on the outer surface of the elongated body 415 that is specific to a corresponding writing instrument disposed inside the elongated body 415. However, in some embodiments, the device 400 that is configured to produce a single color may also include multiple actuation mechanisms, all of one color or all of the same color, and that correspond with writing instruments, all of just one color or all of the same color. In yet another embodiment, the device 400 may be configured to produce a single color and may not include any actuation mechanism. Hence, the writing instrument in such a device 400 may be fixed, and the end of the writing instrument may be exposed permanently outside the opening 452 and is not capable of being extended or retracted into and out of the elongated body 415. In yet another embodiment, the device 400 may include exactly one actuation mechanism at a top-most portion of the first housing 410 for facilitating deployment of the writing instrument between a deployed position outside of the elongated body 415 and a retracted position inside of the elongated body 415.

Differently from FIG. 1, the device 400 of FIGS. 4A-4C may include a wired charging feature. To enable the wired charging feature, the actuation mechanism 420A of the device 400 may be specific to a charging cable 425 A disposed inside the elongated body 415. When the user pushes down on the actuation mechanism 420A, the charging cable 425A may slide out of an opening 454 located in the outer sidewall of the elongated body 415. It is also perceivable that an embodiment may involve the charging cable 425A being configured to project out of the opening 452 formed at the distal end of the first housing 450. In this instance, the opening 452 may be configured with dual ports, one to accommodate at least one of the writing instruments 425B, 425C, 425D at a time and the other to accommodate deployment of the charging cable 425A. Here, individual cylinders or tubes (not shown) may be connected to the actuation mechanisms and extend to the corresponding opening to assist with guiding and to ensure an appropriate deployment of either the writing instruments 425B, 425C, 425D or the charging cable 425A. In other embodiments, the first housing 410 and the second housing 450 may simply be separated from one another exposing the charging cable 425A, as shown in FIG. 4C. In this embodiment; however, use of the writing instruments 425B, 425C, 425D while charging the receiver device 200 may not be permitted. The charging cable 425A may include a power connector 427.

The power connector 427 may be inserted into an appropriate port of the receiver device 200 such as, for example, a mobile phone, laptop computer, electronic reading tablets, earphones, speakers, microphones and other audio devices to enable power transfer from the device 400 to the receiver device 200. For example, the power connector 427 may be a USB connector, a micro USB connector, a lightning connector, or any other connector that is now known or later developed for charging a device or a battery therein.

The charging cable 425A may be connected to a PCB 130 similar to the one described in reference to FIG. 1. The PCB 130 may in turn be connected to a power source such as a battery similar to the one described in reference to FIGS. 1 and 3A-3B. The PCB 130 in the device 400 may include a circuitry required to enable the wired charging feature, and to activate or deactivate the wired charging feature. To that end, the PCB 130 in the device 400 may include a battery management system (BMS) circuit. However, the PCB 130 may include other circuitries configured to perform the functions of the device 400 described herein. In one embodiment, the power transfer may be initiated upon the power connector 427 being inserted into the port of the receiver device 200. In some embodiments, the power transfer may not be initiated immediately upon the power connector 427 being connected to the receiver device 200. For example, a switch 135 similar to the one described in reference to FIG. 1 may be formed on the elongated body 415, and the power transfer may be initiated upon the switch 135 being pressed by a user. An indicator 140 similar to the one described in reference to FIG. 1 may also be included on the device 400, to signal the status of wired charging.

Therefore, although not explicitly shown in FIGS. 4A-4B, the device 400 may also comprise an indicator, a switch, and a battery, all of which are operatively connected to a PCB. The indicator, switch, battery, and PCB of the device 400 may operate and be configured in a similar manner to that described in reference to FIGS. 1 and 3A-3B, in order to control wired charging and signal the status of the wired charging. Thus, for the sake of brevity, the operations and configurations of these components will not be repeated in this section. Since the device 400 is configured for wired charging, the induction coil discussed in reference to FIG. 1 may not be needed. However, in some embodiments, the device 400 may comprise induction coil(s) to additionally provide the wireless charging capability as described above. In such a case, the device 400 may be capable of both wired and wireless charging.

FIG. 5A shows a schematic side view of an embodiment of a writing device 500 configured for wireless charging. In particular, FIG. 5A illustrates an exemplary configuration (e.g., placement) of a writing instrument 525, a battery 560, a PCB 530, and a power transmitter 570 implemented in the device 500. Other components of the device 500 such as, for example, a housing or a body, a cap, etc. are not explicitly shown in FIG. 5A for the purpose of clearly illustrating the configuration. Notably, the device 500 may use an appropriately-sized writing instrument 525 (e.g., ink cartridge) that allows for an adequate space for a battery 560 and a PCB 530. It will be apparent to one of ordinary skill in the art that certain components and configurations thereof of the device 100 explained above may also be applicable to the device 500. For the sake of brevity, detailed description of these components and configurations thereof will not be repeated in the following sections.

The device 500 may be configured to charge other electronic devices wirelessly, such as by using a power transmitter 570 installed on the device 500 as shown in FIG. 5B, In one embodiment, the power transmitter 570 may be installed between the inner wall of a housing (not shown) of the device 500 and the space occupied by the PCB 530, battery 560, and writing instrument 525. In other embodiments, the power transmitter 570 may be embedded in the housing of the device 500, or may be installed on the outer sidewall of the housing of the device 500. In such a case, the housing of the device 500 may just enclose the PCB 530, battery 560, and writing instrument 525, and not the power transmitter 570.

The writing instrument 525 of the device 500 may be an advanced ink system such as, for example, a cartridge-less reservoir. Such writing instrument 525 may form a reservoir as part of the housing of the device 500, and may not be a separate, detachable ink cartridge as those depicted in FIG. 4B (herein referred to as a "standard reservoir"). For example, the housing of the device 500 itself may store ink, with the inner wall of the housing being in direct contact with the ink. Because such writing instrument 525 usually has a diameter larger than that of a standard reservoir, the writing instrument 525 may be able to store at least an equal amount of ink as that of the standard reservoir while having a shorter length. For example, when compared to a standard reservoir of equal length, the ink capacity (i.e., a storable amount of ink) of the writing instrument 525 may be approximately three times the ink capacity of the standard reservoir. Therefore, as depicted in FIG. 5A, the writing instrument 525 may be substantially shortened to make space available for other components needed for wireless charging (e.g., a battery 560, a PCB 530, and a power transmitter 570), without substantially impacting the mileage or usable life of the writing/drawing function of the device 500. In one embodiment, the use of the writing instrument 525 may free up the space inside the housing to approximately two thirds (⅔) of the length of the device 500, in which the components associated with wireless charging may be installed. However, the writing instrument 525 can be adjusted to any length, depending on the dimensions and characteristics of other components including those associated with wireless charging. In some embodiments, to preserve space inside the housing, the power transmitter 570 can be disposed in the clip of the writing instrument.

As depicted in FIG. 5A, a battery 560 may be installed adjacent the writing instrument 525. That is, when the device 500 is in an upright (i.e., vertical) position with the end of the writing instrument 525 pointing downward, the battery 560 may be installed above the writing instrument 525. The battery 560 may be cylindrical-shaped. As explained above, the battery 560 may be a disposable battery such as, for example, a lithium battery, or a rechargeable battery such as, for example, a lithium-ion battery. In one embodiment, the battery 560 may have a charging capacity that is less than or equal to approximately 500 mAh. However, the charging capacity of the battery 560 may be adjusted to a lower or higher level, depending on the charging needs and space available in the device 500, and/or such that the writing/drawing experience is not substantially degraded by negatively impacting the weight, center of gravity, and/or other relevant characteristics of the device 500. In an alternate embodiment, the battery 360A or 360B in FIGS. 3A-3B may be installed in the device 500 in a manner similar to that explained in reference to FIGS. 3A-3B.

A PCB 530 may be installed adjacent the battery 560, towards the other end of the device 500. That is, when the device 500 is in an upright (i.e., vertical) position with the end of the writing instrument 525 pointing downward, the PCB 530 may be installed above the battery 560. As explained above in reference to FIG. 1, the PCB 530 may be bendable or flexible, and may include a circuitry operatively coupled to the battery 560 and the power transmitter 570 to enable wireless charging.

Continuing with reference to FIG. 5A, a power transmitter 570 may be installed within the housing of the device 500, between the inner wall of the housing and the space occupied by the PCB 530, battery 560, and writing instrument 525. As explained above, the power transmitter 570 may also be installed outside the housing of the device 500. In one embodiment, the power transmitter 570 may be installed substantially toward the top end of the device 500 as shown in FIG. 5A. However, the placement of the power transmitter 570 is not limited to this configuration and the power transmitter 570 may be placed at any suitable location along the periphery of the space occupied by the PCB 530, battery 560, and writing instrument 525. As explained above, the power transmitter 570 may include induction coil(s), plastronics antenna(s), ceramic antenna(s), or any suitable power transmitter that is now known or later developed to be capable of transferring power wirelessly.

FIG. 5B shows a schematic side view of an embodiment of a writing device 550 configured for wired charging. In particular, FIG. 5B illustrates an exemplary configuration (e.g., placement) of a writing instrument 525, a battery 560, and a PCB and power connector (together referenced as 537) implemented in the device 550. Other components of the device 550 such as, for example, a housing or a body, a cap, etc., are not explicitly shown in FIG. 5B for the purpose of clearly illustrating the configuration. Notably, the device 550 may use an appropriately-sized writing instrument 525 (e.g., ink cartridge) that allows for an adequate space for a battery 560 and a PCB and power connector 537. It will be apparent to one of ordinary skill in the art that certain components and configurations thereof of the device 400 explained above may also be applicable to the device 550. For the sake of brevity, detailed description of these components and configurations thereof will not be repeated in the following sections.

The device 550 may be configured to charge other electronic devices in a "wired" or "wireless" manner, such as by using a power connector installed at a distal end of the device 550. As shown in FIG. 5B, the power connector may be installed at a distal end that is opposite from the end of the writing instrument 525, which may be a felt tip, ball point tip, or any other tip well known for writing, drawing, etc. The writing instrument 525 of the device 550 may be an advanced ink system such as, for example, a cartridge-less reservoir, same as the one described in reference to the device 500. As depicted in FIG. 5B, the writing instrument 525 may be substantially shortened to make space available for other components needed for wired charging (e.g., a battery 560 and a PCB and power connector 537), without substantially impacting the mileage or usable life of the writing/drawing function of the device 550. In one embodiment, the use of the writing instrument 525 may free up the space inside the housing to approximately two thirds (⅔) of the length of the device 550, in which the components associated with wired charging may be installed. However, the writing instrument 525 can be adjusted to any length, depending on the dimensions and characteristics of other components including those associated with wired charging.

As depicted in FIG. 5B, a battery 560 may be installed adjacent the writing instrument 525. That is, when the device 550 is in an upright (i.e., vertical) position with the end of the writing instrument 525 pointing downward, the battery 560 may be installed above the writing instrument 525. The battery 560 in FIG. 5B may be configured in the same manner as, or in a manner similar to that described in reference to the battery 560 in FIG. 5A.

Continuing with reference to FIG. 5A, a PCB and power connector 537 may be installed adjacent the battery 560, towards the other end of the device 550. That is, when the device 550 is in an upright (i.e., vertical) position with the end of the writing instrument 525 pointing downward, the PCB and power connector 537 may be installed above the battery 560. More specifically, the PCB may be installed between the battery 560 and the power connector, and may include a circuitry operatively connected to the battery 560 and the power connector to enable wired charging. As explained above in reference to FIGS. 4A-4C, the PCB in the device 550 may be bendable or flexible. The power connector in the device 550 may include any of the connectors described above with respect to the power connector 427. While the PCB, battery 560, and writing instrument 525 may be disposed within the housing of the device 550, all or a portion of the power connector may be exposed via an opening at a distal end of the housing. The exposed power connector may be inserted into a corresponding port of a receiver device 200 for charging, as explained above. In some embodiments, the exposed power connector may be concealed by attaching a removable cap over the opening at the distal end of the housing. The removal cap may be attached to the housing by snap-fit, twist-screw connection, or any other similar connection that is now known or later developed in the art.

Embodiments of the present disclosure may include one or more benefits, including, but not limited to 1) the ability to charge electronic devices with a common office or other personal item without the need for a dedicated charging device, 2) the ability to charge electronic devices without a wired connection, and 3) the ability to charge an electronic device without surface-to-surface contact with the electronic device.

As is evident from the figures, text, and examples presented above, a variety of embodiments may be contemplated as follows:

1. A device for wirelessly charging electronics, the device comprising:
   a housing;
   at least one writing instrument disposed in the housing;
   a power transmitter disposed inside or formed on the housing, the power transmitter being configured to transmit power for charging electronics; and
   a battery disposed inside or embedded in the housing, the battery being configured to provide power to the power transmitter to transmit the power.

2. The device of embodiment 1, further comprising a circuitry disposed within the housing and operatively connected to the power transmitter and the battery, wherein the circuitry is embodied in a flexible printed circuit board (PCB).

3. The device of any one of the preceding embodiments, further comprising a circuitry disposed within the housing and operatively connected to the power transmitter and the battery, wherein the circuitry is bent or rolled along an inner wall of the housing.

4. The device of any one of the preceding embodiments, wherein the housing includes a first housing and a second housing that are separable from one another.

5. The device of any one of the preceding embodiments, further comprising at least one actuation mechanism formed on the housing and being operatively connected to the at least one writing instrument.

6. The device of any one of the preceding embodiments, further comprising an indicator configured to signal a status of the device.

7. The device of any one of the preceding embodiments, wherein the at least one writing instrument is an ink cartridge, a lead pencil, or a cartridge-less ink reservoir.

8. The device of any one of the preceding embodiments, wherein the battery is rechargeable.

9. The device of any one of the preceding embodiments, wherein the battery is a hollow cylinder.

10. The device of any one of embodiments 1 through 8, wherein the battery is an arc that extends partially around a circumference of the housing.

11. The device of any one of the preceding embodiments, wherein the power transmitter is configured to generate an electromagnetic field.

12. The device of any one of the preceding embodiments, wherein the power transmitter comprises an induction coil.

13. A device for charging electronics, the device comprising:
   a housing including an opening;
   a writing instrument;
   a first actuation mechanism formed on the housing and being operatively connected to the writing instrument;
   a charging cable;
   a second actuation mechanism formed on the housing and being operatively connected to the charging cable, wherein the charging cable is configured to slide out of the opening when the second actuation mechanism is pushed; and a battery configured to provide power through the charging cable.

14. The device of embodiment 13, further comprising:
   a circuitry disposed within the housing and operatively connected to the battery and the charging cable.

15. The device of embodiment 14, wherein the circuitry is embodied in a flexible printed circuit board (PCB).

16. The device of any one of the preceding embodiments, wherein the circuitry is bent or rolled along an inner wall of the housing.

17. The device of any one of the preceding embodiments, wherein the circuitry is installed between the writing instrument and an inner wall of the housing.

18. The device of any one of the preceding embodiments, wherein the writing instrument is an ink cartridge or a lead pencil.

It will be appreciated by those skilled in the art that changes could be made to the embodiments described above without departing from the broad inventive concept thereof. It is understood, therefore, that the present disclosure herein is not limited to the particular embodiments disclosed and is intended to cover modifications within the spirit and scope of the present disclosure.

What is claimed is:

1. A device for wirelessly charging electronics, the device comprising:
   a housing;
   at least one writing instrument disposed in the housing;
   a power transmitter comprising an induction coil disposed inside or formed on the housing, the power transmitter being configured to transmit power for charging electronics; and a battery disposed inside or embedded in the housing, the battery being configured to provide power to the power transmitter to transmit the power;

wherein the induction coil is configured for omnidirectional wireless charging, the induction coil including a plurality of crossed dipole coils.

2. The device of claim 1, further comprising a circuitry disposed within the housing and operatively connected to the power transmitter and the battery, wherein the circuitry is embodied in a flexible printed circuit board (PCB).

3. The device of claim 1, further comprising a circuitry disposed within the housing and operatively connected to the power transmitter and the battery, wherein the circuitry is bent or rolled along an inner wall of the housing.

4. The device of claim 1, wherein the housing includes a first housing and a second housing that are separable from one another.

5. The device of claim 1, further comprising at least one actuation mechanism formed on the housing and being operatively connected to the at least one writing instrument.

6. The device of claim 1, further comprising an indicator configured to signal a status of the device.

7. The device of claim 1, wherein the at least one writing instrument is an ink cartridge, a lead pencil, or a cartridgeless ink reservoir.

8. The device of claim 1, wherein the battery is rechargeable.

9. The device of claim 1, wherein the battery is a hollow cylinder.

10. The device of claim 1, wherein the battery is an arc that extends partially around a circumference of the housing.

11. The device of claim 1, wherein the power transmitter is configured to generate an electromagnetic field.

12. The device of claim 1, further comprising a circuitry disposed within the housing and operatively connected to the power transmitter and the battery, wherein the circuitry is embodied in a flexible printed circuit board (PCB); and
wherein the circuitry extends over a circumferential distance spanning between 25% and 33% of an inner circumference of the housing.

13. The device of claim 1 further comprising a switch on an outer sidewall of the housing, the switch configured to activate or deactivate the power transmitter.

14. The device of claim 1, further comprising an indicator configured to signal a status of the device, the indicator being a light emitter which selectively flashes and/or emits one or more colored lights to indicate one or more conditions of the device;
wherein the light emitter emits a first light in a first condition, and emits a second light that is different than the first light in a second condition; and
wherein the light emitter further emits a third light that is different than the first light and the second light, the third light indicating a third condition.

15. The device of claim 1, further comprising at least one actuation mechanism formed on the housing and being operatively connected to the at least one writing instrument, the at least one actuation mechanism is configured to be customizable by a user such that each of the actuation mechanisms is colored to match a color of the writing instrument.

16. The device of claim 1, further comprising:
a circuitry disposed within the housing and operatively connected to the power transmitter and the battery, wherein the circuitry is embodied in a flexible printed circuit board (PCB), wherein the circuitry extends over a circumferential distance spanning between 25% and 33% of an inner circumference of the housing;
a switch on an outer sidewall of the housing, the switch configured to activate or deactivate the power transmitter; and
an indicator configured to signal a status of the device, the indicator being a light emitter which selectively flashes and/or emits one or more colored lights to indicate one or more conditions of the device, wherein the light emitter emits a first light in a first condition, and emits a second light that is different than the first light in a second condition, and wherein the light emitter further emits a third light that is different than the first light and the second light, the third light indicating a third condition.

17. The device of claim 1, further comprising:
at least one actuation mechanism formed on the housing and being operatively connected to the at least one writing instrument, the at least one actuation mechanism is configured to be customizable by a user such that each of the actuation mechanisms is colored to match a color of the writing instrument;
a circuitry disposed within the housing and operatively connected to the power transmitter and the battery, wherein the circuitry is embodied in a flexible printed circuit board (PCB), wherein the circuitry extends over a circumferential distance spanning between 25% and 33% of an inner circumference of the housing;
a switch on an outer sidewall of the housing, the switch configured to activate or deactivate the power transmitter; and
an indicator configured to signal a status of the device, the indicator being a light emitter which selectively flashes and/or emits one or more colored lights to indicate one or more conditions of the device, wherein the light emitter emits a first light in a first condition, and emits a second light that is different than the first light in a second condition, and wherein the light emitter further emits a third light that is different than the first light and the second light, the third light indicating a third condition;
wherein the induction coils are configured for omnidirectional wireless charging, the induction coils including a plurality of crossed dipole coils.

18. A device for wirelessly charging electronics, the device comprising:
a housing;
at least one writing instrument disposed in the housing;
at least one actuation mechanism formed on the housing and being operatively connected to the at least one writing instrument;
a power transmitter disposed inside or formed on the housing, the power transmitter being configured to transmit power as an electromagnetic field for charging electronics;
a battery that is rechargeable and disposed inside or embedded in the housing, the battery being configured to provide power to the power transmitter to transmit the power; and
a circuitry disposed within the housing and operatively connected to the power transmitter and the battery, wherein the circuitry is embodied in a flexible printed circuit board (PCB), wherein the circuitry extends over a circumferential distance spanning between 25% and 33% of an inner circumference of the housing.

19. The device for wirelessly charging electronics of claim 18, wherein the power transmitter includes one or more induction coils that are configured for omnidirectional wireless charging, the induction coils including a plurality of crossed dipole coils.

20. A device for wirelessly charging electronics, the device comprising:
- a housing;
- at least one writing instrument disposed in the housing, the at least one writing instrument being an ink cartridge, a lead pencil, or a cartridge-less ink reservoir, the at least one instrument having a first color;
- at least one actuation mechanism formed on the housing and being operatively connected to the at least one writing instrument;
- a power transmitter disposed inside or formed on the housing, the power transmitter being configured to transmit power for charging electronics; and
- a battery that is rechargeable and disposed inside or embedded in the housing, the battery being configured to provide power to the power transmitter to transmit the power, wherein the battery extends partially around a circumference of the housing;
- an indicator configured to signal a status of the device, the indicator being a light emitter which selectively flashes and/or emits one or more colored lights to indicate one or more conditions of the device.

* * * * *